(12) United States Patent
Kirby et al.

(10) Patent No.: US 6,549,229 B1
(45) Date of Patent: Apr. 15, 2003

(54) SMALL, PORTABLE, SELF-CONTAINED, VIDEO TELECONFERENCING SYSTEM

(75) Inventors: Kevin Arthur Kirby, Mechanicsville, MD (US); John Joseph Flynn, Lexington Park, MD (US); James Allen Evans, St. Leonard, MD (US)

(73) Assignee: C-Cubed Corporation, Springfield, VA (US)

( * ) Notice: Subject to any disclaimer, the term of this patent is extended or adjusted under 35 U.S.C. 154(b) by 0 days.

(21) Appl. No.: 09/619,689

(22) Filed: Jul. 19, 2000

Related U.S. Application Data

(60) Provisional application No. 60/145,274, filed on Jul. 26, 1999.

(51) Int. Cl.[7] .................................................. H04N 7/14
(52) U.S. Cl. ............................... 348/14.01; 348/14.08; 348/14.13
(58) Field of Search ................... 348/14.01, 14.02, 348/14.03, 14.04, 14.05, 14.08, 14.09, 14.1, 14.11, 14.12, 14.13; H04N 7/14

(56) References Cited

U.S. PATENT DOCUMENTS

| | | | | |
|---|---|---|---|---|
| 5,524,134 A | * | 6/1996 | Gustafson et al. ............. | 379/58 |
| 5,550,754 A | * | 8/1996 | McNelley et al. ........ | 348/14.08 |
| 6,121,998 A | * | 9/2000 | Voois et al. .............. | 348/14.01 |

FOREIGN PATENT DOCUMENTS

| | | | | |
|---|---|---|---|---|
| DE | 3640680 A | * | 6/1998 | ............ H04N/7/14 |
| JP | 403289891 A | * | 12/1991 | ............ H04N/7/14 |
| JP | 406141089 A | * | 5/1994 | .......... H04M/11/00 |
| JP | 408130720 A | * | 5/1996 | ............ H04N/7/14 |
| JP | 410200519 A | * | 7/1998 | ............ H04L/9/08 |
| JP | 10285569 A | * | 10/1998 | ............ H04N/7/15 |

* cited by examiner

Primary Examiner—Melur Ramakrishnaiah
(74) Attorney, Agent, or Firm—Wiley Rein & Fielding LLP

(57) ABSTRACT

The present Invention relates to a portable, self-contained, briefcase-sized device capable of transmitting and receiving encrypted or unencrypted video teleconferencing communications over a variety of telecommunications mediums. The system contains a liquid crystal flat panel display, a flexible gooseneck video camera, built-in microphones and speakers, a pop-up bay to receive a military or civilian encryption unit, a variety of input and output connections, a modem-codec and ancillary electronics circuitry, a remote control device, interconnecting cabling, and operating software, all contained within a portable, metal reinforced, lockable, briefcase-type enclosure. The Invention can be connected to a telecommunications link such as a LAN, an Integrated Services Digital Network (ISDN) line provided by the local telephone company, or a Satellite Communications (SATCOM) system such as the International Maritime Satellite (INMARSAT) System. Through such communication connections the Invention can receive and transmit live video, videotape, or data, to distant end-stations equipped with the Invention or any standardized Video Teleconferencing (VTC) system.

1 Claim, 5 Drawing Sheets

SMALL, PORTABLE, SELF-CONTAINED, VIDEO TELECONFERENCING SYSTEM

This application claims benefit of provisional Application No. 60,145,274 filed Jul. 26, 1999.

FIELD OF INVENTION

The Invention is in the field of video teleconferencing communication equipment and more particularly self-contained portable video teleconferencing systems.

BACKGROUND OF THE INVENTION

Available videoconferencing equipment is designed and packaged for use in permanent fixed site conference or boardrooms. There exists a need for a self-contained, portable video teleconferencing system that is lightweight and provides for encryption/decryption of the video signal. The system should have high quality video, have the capability to be set up and be operational in a short period of time, operate from a wide range of supply voltages and have a serial interface for interfacing with satellite terminals, ISDN terminal adapters, or other digital transmission devices. The Invention is designed to and does provide an integrated, self-contained set of video communications solutions to users in the remote field locations or where videoconferencing equipment is otherwise not available.

SUMMARY OF THE INVENTION

The present Invention relates to a portable, self-contained, briefcase-sized video teleconferencing system capable of transmitting and receiving video teleconferencing communications at speeds from 56 Kbps up to 768 Kbps. The Invention comprises a video coder/decoder ("CODEC"), along with other commercially available electronic components, including a video camera, a microphone, a video monitor and interface for various peripheral devices, all controlled by a hand-held remote control device, integrated into a briefcase-type product that provides boardroom quality videoconferencing capabilities to remote sites around the world. The individual components of the Invention may be obtained by disassembling commercially-available assemblies to remove the individual components and installing the removed components within the portable suitcase. For example, a commercially available CODEC assembly, which integrates the CODEC, video camera, microphone, and serial interface, can be disassembled to allow the individual components to be mounted in a portable suitcase. The Invention also may transmit and receive in a secure environment through an optional, installable encryption/decryption or COMSEC device. The unit is preferably self-contained requiring only a source of AC power and a communications link, including satellite communications. Thus, the Invention may be transported to and used in any location in the world at which AC power is available thereby expanding the availability of boardroom quality videoconferencing to practically all areas of the world in which such communications were not previously available.

A technical advantage of the present Invention is that it may be used to provide boardroom quality video teleconferencing via a variety of conventional communications links.

Another technical advantage is that the present Invention can be easily transported via commercial air to remote locations where boardroom quality video teleconferencing is not currently available.

Another technical advantage is that the present Invention provides a self-contained system for military or civilian encrypted video teleconferencing without external wiring to an encryption device.

Another technical advantage is that the present Invention provides a portable suitcase with a lockable, durable outer shell to protect the electronics of the video teleconferencing system, including an installed COMSEC device.

Disclosed herein is a portable suitcase device for video teleconferencing over a telecommunication link, which device comprises: a portable suitcase having a durable outer shell, a lower storage compartment, an upper storage compartment, and a hinge that hingeably connects the lower storage compartment to the upper storage compartment; a video monitor mounted within the upper storage compartment of the suitcase; a speaker mounted within the suitcase; a communications interface for electrically coupling the device to the telecommunications link, the communications interface mounted within the suitcase, and the communications interface being capable of receiving and transmitting video and audio signals; and a CODEC, the CODEC for decoding video and audio signals received over the telecommunications link and for displaying the video signal on the video monitor and for playing the audio signal over the speaker, and the CODEC for encoding video and audio signals for transmission across the telecommunications link; a video interface coupled to the CODEC to permit a video signal to be input and sent via the telecommunications link; and a microphone interface coupled to the CODEC to permit an audio signal to be input and sent via the telecommunications link. The device may also comprise a COMSEC housing being mounted within the suitcase, wherein a COMSEC device can be placed within the housing and electrically coupled to the CODEC and the communications interface, such that audio and video signals to be transmitted across the telecommunications link are encrypted before transmission, and such that audio and video signals received on the telecommunications link may be decrypted. The COMSEC housing may be retractably mounted to the suitcase to permit movement between a stowed position, in which the COMSEC housing may be stowed when a COMSEC device is not being used in conjunction with the device, and an operating position, in which at least a portion of a COMSEC device is housed within the COMSEC housing. The COMSEC housing also may be rotably mounted to the suitcase. The device may also comprise a COMSEC device, which is preferably a KIV-7 COMSEC device. The CODEC may be mounted within the suitcase. Preferably, the suitcase is sized to fit in a selected one of underneath a passenger seat in a commercial aircraft and in an overhead bin above a passenger seat in a commercial aircraft. A remote control may also be provided for controlling at least one function of the device. Video signals may be provided to the device by a video camera, a videocassette recorder, or a workstation. Audio signals may be provided to the device by a microphone, a videocassette recorder, or a workstation. Data may be supplied to the device by a workstation or a local area network. The telecommunications link may comprise a satellite link, an ISDN terminal adapter, an IMUX, an Ethernet connection, a local area network, a telephone line, or a serial connection. The device may also comprise a first set of support elements mounted in the case to hold the CODEC in one of the lower storage compartment and the upper storage compartment; a second set of support elements mounted in the case to hold the video monitor within the upper storage compartment; a third set of support elements mounted in the case to hold the COMSEC housing in one of the lower storage compartment and the upper storage compartment; and a fourth set of support elements mounted in the case to hold the communications interface in one of the lower storage compartment and the upper storage compartment.

Also disclosed herein is a method of assembling a portable suitcase device for video teleconferencing over a plurality of telecommunication links, which method comprises the steps of: providing a portable suitcase having a durable outer shell, a lower storage compartment, an upper storage compartment, and a hinge that hingeably connects the lower storage compartment to the upper storage compartment; providing a CODEC; mounting the CODEC in one of the lower storage compartment and the upper storage compartment; providing a communications interface for coupling the device to a telecommunications link for receiving a first video signal and a first audio signal; mounting the communications interface in the one of the lower storage compartment and the upper storage compartment; providing a video interface for receiving a second video signal; mounting the video interface in one of the lower storage compartment and the upper storage compartment; electrically coupling the video interface to the CODEC; providing an audio interface for receiving a second audio signal; mounting an audio interface in one of the upper storage compartment and the lower storage compartment; electrically coupling the audio interface to the CODEC; providing a video monitor for displaying at least one of the first video signal and the second video signal; mounting the video monitor in the upper storage compartment; electrically coupling the video monitor to the CODEC; providing a speaker for playing at least one of the first audio signal and the second audio signal; mounting the speaker in one of the lower storage compartment and the upper storage compartment; electrically coupling the speaker to the CODEC; and electrically coupling the communications interface to the CODEC, whereby the first video signal can be received from the telecommunications link, decoded, and transmitted to the video monitor, the first audio signal can be received from the telecommunications link, decoded, and transmitted to the speaker, and the second video signal and the second audio signal can be encoded by the CODEC for transmission over the telecommunications link. The method optionally may include providing a remote control receiver; mounting the remote control receiver in the upper storage compartment; and electrically coupling the remote control receiver to the CODEC. The method may also include mounting a video camera in one of upper storage compartment or lower storage compartment; and electrically coupling the video camera to the video interface. The method may also include providing a COMSEC housing wherein a COMSEC device can be placed at least partially within the COMSEC housing; mounting the COMSEC housing in one of the lower storage and the upper storage compartment; and electrically coupling the COMSEC housing to the CODEC and the communications interface so that, when a COMSEC device is being used in conjunction with the device, the audio and video signals to be transmitted across the telecommunications link may be encrypted before transmission, and the audio and video signals received on the telecommunications link may be decrypted. The method may also include providing a data interface for coupling the device to a telecommunications link for receiving a first data signal; mounting the data interface in one of the lower storage and the upper storage compartment; and electrically coupling the data interface to the CODEC, whereby the first data signal can be encoded by the CODEC for transmission over the telecommunications link and a second data signal can be received from the telecommunications link, decoded, and transmitted via the data interface. The method optionally includes providing a COMSEC housing wherein a COMSEC device can be placed at least partially within the COMSEC housing; mounting the COMSEC housing in one of the lower storage and the upper storage compartment; and electrically coupling the COMSEC housing to the CODEC and the communications interface so that, when a COMSEC device is being used in conjunction with the device, the audio and video signals to be transmitted across the telecommunications link may be encrypted before transmission, and the audio and video signals received on the telecommunications link may be decrypted and so that the first data signal may be decrypted when received and encrypted before transmission via the telecommunications link and the second data signal may be decrypted when received and encrypted before transmission via the data interface. The plurality of telecommunications links may comprise two or more of the following: a satellite link, an ISDN terminal adapter, an IMUX, an Ethernet connection, a local area network, a telephone line, and a serial connection. The portable suitcase may be water resistant when closed.

Also disclosed herein is a portable, self-contained device for conducting video teleconferencing over a variety of telecommunications links, which device comprises: an A/C Input Module provides A/C power from an external A/C power source to the invention; a Power Supply receives A/C power from the A/C Input Module, converts the A/C power to D/C output and supplies that output to other elements of the invention; a Voltage Divider receives 12 volts D/C power from the Power Supply and divides-that D/C power into six volt D/C power which it supplies to the Video Camera; a Video Power Switch controls the supply of power to the Video Camera by means of a momentary push button on/off switch that opens and closes the power path to the Video Camera; a Video Camera receives light signal input and convert it to color "S Video Output" suitable for processing by the CODEC; a Camera Interface Module that serves as an adapter for the Video Camera connection cable; a Microphone that receives audio input and converts it to signal output suitable for processing by the CODEC; an infrared Receiver that receives infrared signal from Remote Control device and converts the infrared signal to electrical impulses to control function of the CODEC; a Coder/Decoder ("CODEC") that receives video signals from the Video Camera and audio signals from the Microphone and filters and processes those signals for local display on the Video Monitor and speakers; an internal Serial Card that converts signal and adapts the interface to and from the CODEC and the Communications Network Interface Module; a Communications Network Interface Module that converts an incoming standardized signal from an encryption ("COMSEC") Device, when such a device is installed, to a proprietary internal signal and passes it through the Internal Serial Card for processing by the CODEC, and also converts an outgoing proprietary signal to industry standard for external transmission; a hand held, wireless Remote Control that permits the user to direct the functions of the Invention by transmitting commands by infrared signal to the Infrared Receiver; a COMSEC Module Housing that provides interface support and power connection for a COMSEC Device, when installed; and speakers that project audio signal output to the user. A COMSEC Device may be installed for secure, encrypted communications.

The present Invention overcomes the problems and disadvantages associated with conventional methods and systems, and provides improved systems and methods whereby boardroom quality videoconferencing can be made available from remote locations.

Other embodiments and advantages of the Invention are set forth in part in the description that follows, and in part, will be obvious from this description, or may be learned from the practice of the Invention.

a. Com Port 1, High-speed serial interface for connection to satellite terminal, MUX, ISDN terminal adapter, or other serial connection with encryption b. Com Port 2, High-speed serial interface for connection to satellite terminal, MUX, ISDN terminal adapter, or other serial connection c. Monitor, output for an auxiliary monitor d. Camera, input for an external video camera e. VCR, interface for an external video cassette recorder f. Video Out, video output to VCR g. Video In, video in from VCR h. Audio Out, stereo output to VCR i. Audio In, stereo in from VCR j. Phone, interface for standard telephone connection for telephone (audio) conferencing k. Microphone, input from an auxiliary microphone l. Network, interface for LAN m. Workstation, interface for workstation Ethernet connection.

DETAILED DESCRIPTION OF THE INVENTION

The Invention relates to a portable, briefcase-sized video teleconferencing system capable of transmitting and receiving secure video teleconferencing at speeds from 56 Kbps up to 768 Kbps. The preferred embodiment is based on packaging several commercially available components in a unique portable configuration. In the preferred embodiment, the Invention is compact, lightweight, and requires only a source of AC power and a communications link for operation anywhere in the world. It is particularly well suited for operation with small INMARSAT terminals and with ISDN services.

Figure 1:
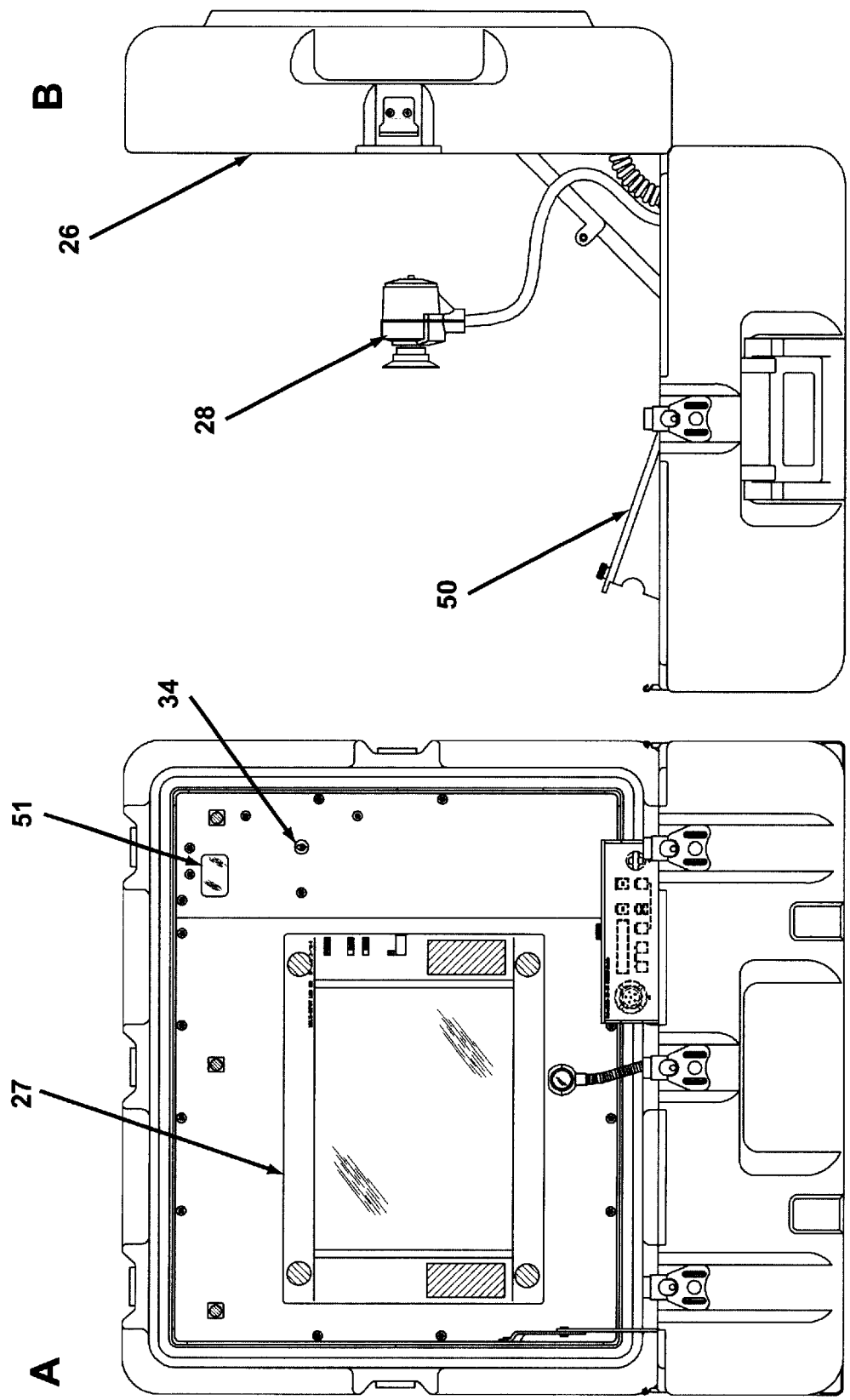
FIG. 1 in this implementation, shows an LCD flat panel display with internal speakers, microphone, and infrared detector for remote control, mounted to support elements in the upper storage compartment of a portable suitcase.

FIG. 1 below is a diagram of the preferred embodiment of the fully assembled video teleconferencing system. The preferred embodiment includes an LCD flat panel display with internal speakers 27, microphone 34, and an infrared detector for remote control 51, mounted in the upper storage compartment of the portable suitcase and a power supply mounted in the upper storage compartment of the portable suitcase under the cover plate. It also includes an electronic pocket for a COMSEC device, otherwise known as a COMSEC housing. The COMSEC device is preferably a KIV-7 COMSEC device. Alternately, a KIV-7 Bypass Box can be inserted into the COMSEC housing to permit the use of Com Port 1 20 without a COMSEC device installed in the COMSEC housing. In the preferred embodiment, the COMSEC housing is a pop-up unit that can be raised during operation and lowered into the stowed position (see FIG. 2) when not in operation and when the case lid is to be closed. The COMSEC housing is shown in the operating position with a KIV-7 COMSEC device inserted and a portion of the COMSEC housing extending above the lower storage compartment. The portable suitcase enclosure is displayed in the front and side views showing the durable outer shell and the lower and upper storage compartments that are connected by the hinge along the rear edge. The latching or locking mechanisms on the side and front of the portable suitcase hold the portable suitcase securely in the closed position and protect the internal electronics, including the COMSEC housing and COMSEC device, if installed, from the elements.

Figure 2:
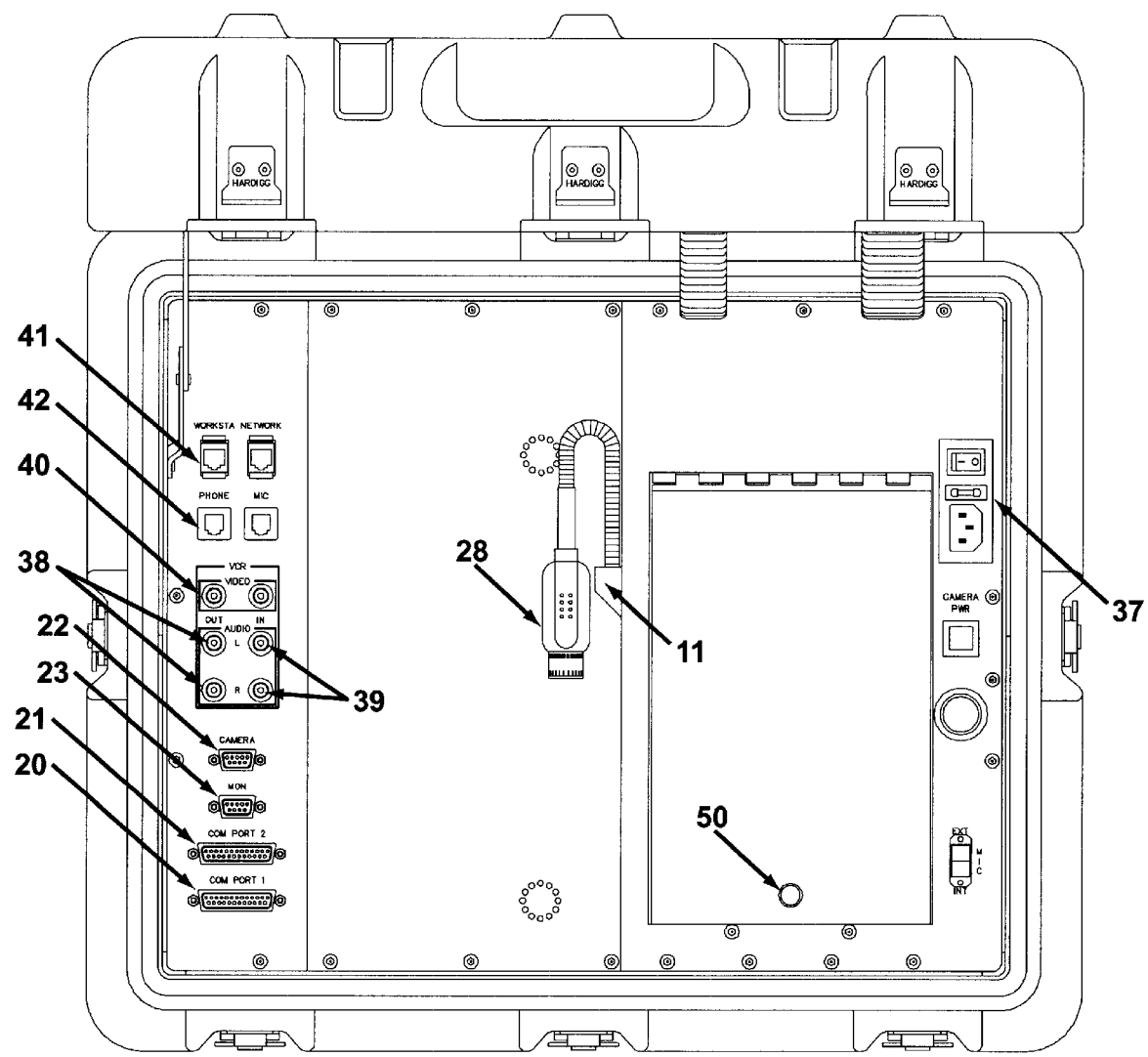
FIG. 2 illustrates the locations of a video camera, signal interface panel, power input receptacle, and pocket or housing for a COMSEC device, mounted to support elements in the lower storage compartment of a portable suitcase. The pocket for the COMSEC device is shown as a pop up unit that can be raised during operation and lowered into the unit when the case lid is to be closed.

FIG. 2 is a top view with the portable suitcase open, displaying the elements installed in the lower storage compartment. Along the left hand side of the lower storage compartment are displayed the various communications interfaces that can be used to connect the teleconferencing system to various communications links. The network and workstation connections 41 allow a workstation or LAN to be connected to the portable video teleconferencing system via Ethernet. Phone and microphone connections 42 are provided to allow the video teleconferencing system to be connected via phone line and to allow an external microphone to be connected to provide an audio signal at the remote location. The teleconferencing system can thereby be used for audio as well as video teleconferencing. Video in and video out interfaces 40 are provided to connect a conventional videocassette recorder (VCR) or other video receiver to the teleconferencing system. The video out interface may be provided to allow the video signal received through a selected communications link to be transmitted to the external video receiver. The video in port permits an external video source to be connected to the teleconferencing system to allow the signals from the external video source to be transmitted over a selected telecommunications link via the video teleconferencing unit from the remote location. Left and right audio out ports 38 permit the audio signal received at the video teleconferencing system from a selected telecommunications link to be transmitted to external speakers, an external video cassette recorder, or other external audio receiver. The left and right audio in ports 39 allow an external audio source to be connected to the video teleconferencing system to allow audio signals from the external audio source to be transmitted via the telecommunications link. External camera connection 22 permits an external camera to be connected to video teleconferencing system to be used in place of or in addition to the installed video camera 28. An external monitor connection 23 is provided to allow the video signal received via the telecommunications link to be transmitted to an external monitor to be used in addition to or in the place of the installed LCD screen 27. Com Port 1 20 and Com Port 2 21 provide serial connections to external telecommunications links as will be discussed below.

Video interface 11 connects the installed camera 28 to the lower storage compartment and electrically couples the installed camera to the CODEC. The COMSEC housing 50 is shown in the stowed position, as would be the case when the COMSEC module is not installed or when it is desired to close the portable suitcase. The rotable, retractable connection of the COMSEC housing to the lower storage compartment permits the COMSEC housing to be rotated from the stowed position, shown here in FIG. 2, to the operating position, shown in FIG. 1, in which at least a portion of a COMSEC device is housed within the COMSEC housing. The AC power interface 37 is used for connecting the video teleconferencing system to an external AC power source.

Figure 3:
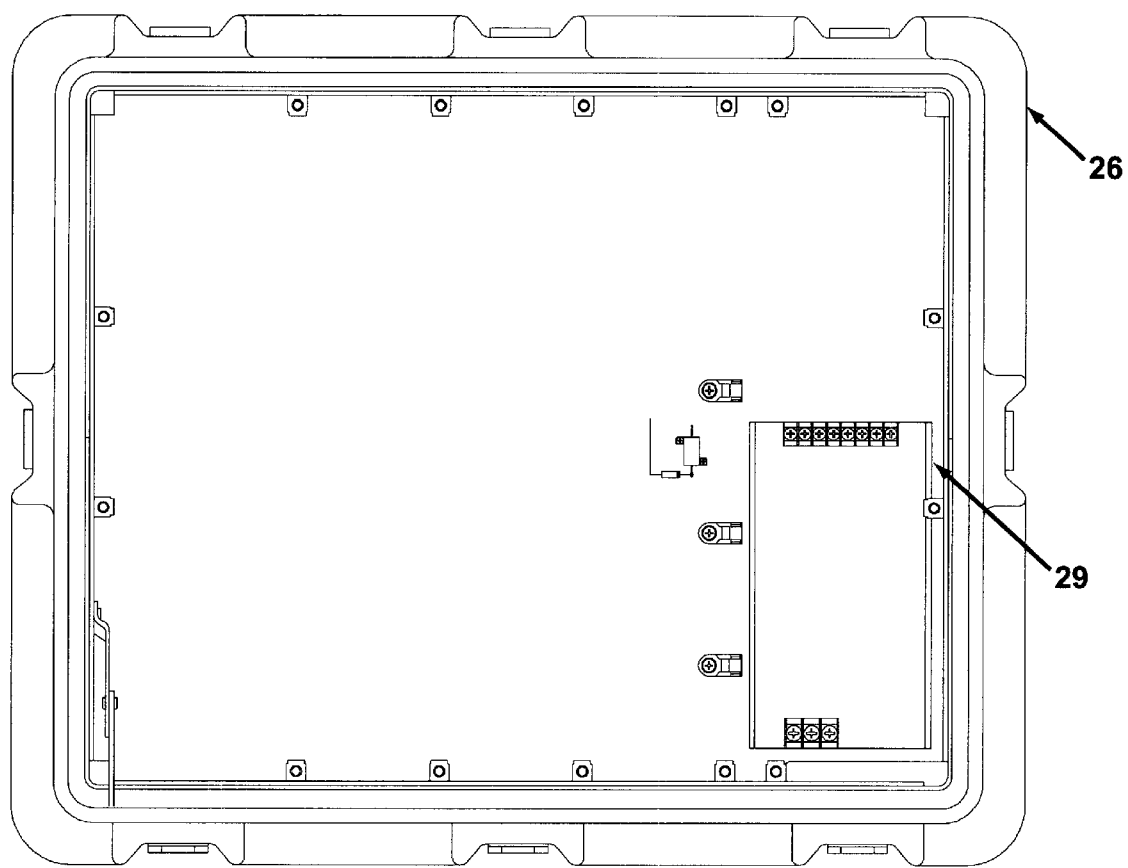
FIG. 3 shows a power supply mounted to support elements in the upper storage compartment under the cover plate.

FIG. 3 below is a diagram of the internal construction of the upper storage compartment 26 of the portable suitcase device with the cover plates removed. Power Supply 29 is shown as installed in the upper storage compartment.

Figure 4:
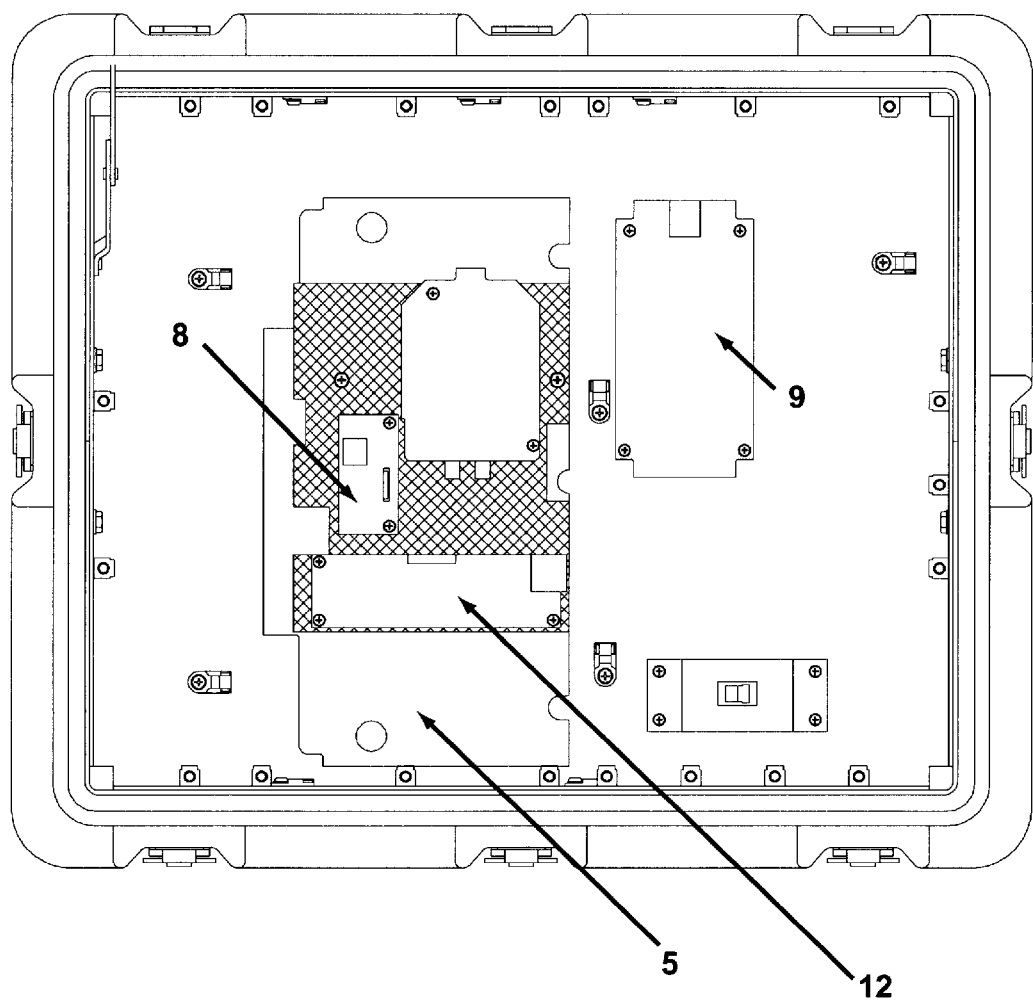
FIG. 4 illustrates the location of a video CODEC board and interface board mounted to support elements located in the lower storage compartment under the cover plate.
Figure 5:
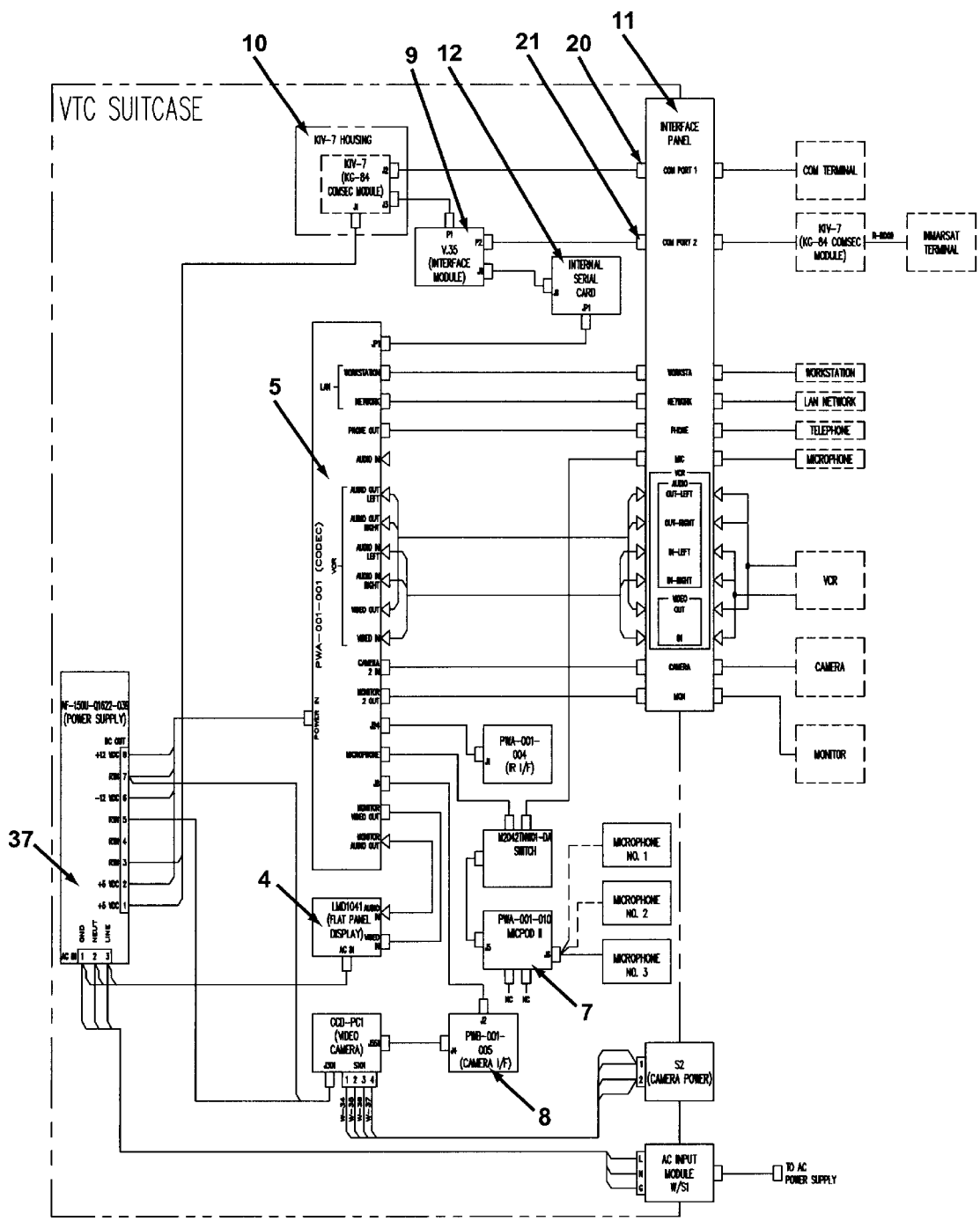
FIG. 5 is a wiring diagram that shows the electrical connections between the various components. In this implementation, the interface panel ports that appear on the interface panel (FIG. 2) are listed below.

FIG. 4 below is a diagram of the internal construction of the lower storage compartment of the portable suitcase in the preferred embodiment. The internal serial card 12 provides an interface from the serial output of the CODEC 5 via the V.35 interface module 9 to Com Port 1 20 and Com Port 2 21 as shown in FIG. 5 and as discussed below, whereby video, audio, and/or data signals processed by the CODEC may be transmitted via a telecommunications link connected to one or both of Com Port 1 and Com Port 2 and video, audio, and/or data signals received from a telecommunications link connected to one or both of Com Port 1 and Com Port 2 may be processed by the CODEC. The CODEC 5 is shown attached to the lower base plate of the lower storage compartment. Mounted above the CODEC are the V.35 interface module 9, the function of which is discussed below, and the video camera interface board 8 that provides an interface between the installed video camera and the CODEC.

FIG. 5 below is a wiring diagram displaying the electrical connections for all of the elements of the video teleconferencing system. In the preferred embodiment, the serial output of the CODEC 5 is fed to the internal serial card 12 and from the internal serial card to the V.35 Interface Module 9. One output of the V.35 card is provided directly to the Interface Panel 11 at Com Port 2 21 and the second output is routed to the COMSEC device via the COMSEC housing 10. The output of the COMSEC housing 10 is routed to the Interface Panel at Com Port 1 20. Other internal inputs to the CODEC include the microphone via the MICPOD 7, the video camera through the camera IF module 8, the flat panel display 4, and the Infrared Control I/F module 8. The AC input power supply module provides DC power to the CODEC 5, COMSEC device 10, and the video camera 8 via voltage divider 14.

For encrypted operation, a COMSEC device is inserted in the COMSEC housing 10, the power cord is connected to the power input 37, and an external communications link, such as an INMARSAT terminal, is connected to Com Port 1 20. The unit power is switched on, the momentary camera power switch depressed, and the unit automatically progresses through a boot-up procedure. A handheld remote device pointed at the infrared receiver 51 in the upper storage compartment of the portable suitcase controls dial up and system operation. If desired, the teleconferencing system may optionally be connected to an external camera, external monitor, external speakers, external VCR, and/or external microphone. The Invention can be connected to a telecommunications link such as a LAN, an Integrated Services Digital Network (ISDN) line provided by the local telephone company, or a Satellite Communications (SATCOM) system such as the International Maritime Satellite (INMARSAT) System. Through such communication connections the Invention can receive and transmit live video, videotape, or data, to distant end-stations equipped with the Invention or any standardized Video Teleconferencing (VTC) system. It is alternately possible to connect an external encryption device to Com Port 2 to permit encrypted video, audio, and/or data signals to be transmitted or received via Coin Port 2 in place of or in parallel with Com Port 1.

For unencrypted operations, the external communications link can be connected to Com Port 2 21, which bypasses any installed COMSEC device. Alternately, a KIV-7 or other COMSEC Bypass Box can be installed to permit unencrypted video, audio, and/or data signals to be transmitted or received via Com Port 1 20 without being encrypted/decrypted. Com Port 1 thereby can be used to provide an unencrypted telecommunications link in place of or in parallel with Com Port 2.

while the Invention has been particularly shown and described in the foregoing detailed description, it will be understood by those skilled in the art that various other changes in form and detail may be made without departing from spirit and scope of the Invention. It is intended that the specification and examples be considered exemplary only with the true scope and spirit of the Invention indicated by the claims below.

What is claimed is:

1. A method of assembling a portable suitcase device for video teleconferencing over a plurality of telecommunication links, said method comprising:

(a) providing a portable suitcase having a durable outer shell, a lower storage compartment, an upper storage compartment, and a hinge that hingeably connects the lower storage compartment to the upper storage compartment;

(b) providing a CODEC;

(c) mounting the CODEC in one of the lower storage compartment and the upper storage compartment;

(d) providing a communications interface for coupling the device to a telecommunications link for receiving a first video signal and a first audio signal;

(e) mounting the communications interface in the one of the lower storage compartment and the upper storage compartment;

(f) providing a video interface for receiving a second video signal;

(g) mounting the video interface in one of the lower storage compartment and the upper storage compartment;

(h) electrically coupling the video interface to the CODEC;

(i) providing an audio interface for receiving a second audio signal;

(j) mounting an audio interface in one of the upper storage compartment and the lower storage compartment;

(k) electrically coupling the audio interface to the CODEC;

(l) providing a video monitor for displaying at least one of the first video signal and the second video signal;

(m) mounting the video monitor in the upper storage compartment;

(n) electrically coupling the video monitor to the CODEC;

(o) providing a speaker for playing at least one of the first audio signal and the second audio signal;

(p) mounting the speaker in one of the lower storage compartment and the upper storage compartment;

(q) electrically coupling the speaker to the CODEC;

(r) electrically coupling the communications interface to the CODEC, whereby the first video signal can be received from the telecommunications link, decoded, and transmitted to the video monitor, the first audio signal can be received from the telecommunications link, decoded, and transmitted to the speaker, and the second video signal and the second audio signal can be encoded by the CODEC for transmission over the telecommunications link;

(s) providing a data interface for providing a first data signal to the CODEC;

(t) mounting the data interface in one of the lower storage compartment and the upper storage compartment;

(u) electrically coupling the data interface to the CODEC, whereby the data signal can be encoded by the CODEC for transmission over the telecommunications link and a second data signal can be received from the telecommunications link, decoded, and transmitted via the data interface;

(v) providing a COMSEC housing wherein a COMSEC device can be placed at least partially within the COMSEC housing;

(w) mounting the COMSEC housing in one of the lower storage compartment and the upper storage compartment; and (x) electrically coupling the COMSEC housing: to the CODEC and the communications interface so that, when a COMSEC device is being used in conjunction with the device, the audio and video signals to be transmitted across the telecommunications link may be encrypted before transmission, and the audio and video signals received on the telecommunications link may be decrypted and so that the first data signal may be decrypted when received and encrypted before transmission via the telecommunications link and the second data signal may be decrypted when received and encrypted before transmission via the data interface.

* * * * *